(12) United States Patent
VanOsdol (10) Patent No.: US 8,771,401 B2
(45) Date of Patent: Jul. 8, 2014

(54) APPARATUS AND PROCESS FOR THE SEPARATION OF GASES USING SUPERSONIC EXPANSION AND OBLIQUE WAVE COMPRESSION

(75) Inventor: John G. VanOsdol, Fairmont, WV (US)

(73) Assignee: U.S. Department of Energy, Washington, DC (US)

(*) Notice: Subject to any disclaimer, the term of this patent is extended or adjusted under 35 U.S.C. 154(b) by 248 days.

(21) Appl. No.: 13/208,784

(22) Filed: Aug. 12, 2011

(65) Prior Publication Data

US 2013/0036764 A1   Feb. 14, 2013

(51) Int. Cl.
*B01D 51/08* (2006.01)

(52) U.S. Cl.
USPC .................................... 95/29; 96/389

(58) Field of Classification Search
CPC .... B01D 3/346; B01D 5/0039; B01D 5/0081; B01D 45/16; B01D 51/08
USPC ............... 55/467, 467.1, 468; 62/601–605, 62/617–619, 637; 95/29, 31, 32, 34, 35; 96/289, 389
See application file for complete search history.

(56) References Cited

U.S. PATENT DOCUMENTS

| | | | |
|---|---|---|---|
| 3,528,216 A * | 9/1970 | Garrett | 62/86 |
| 3,528,217 A | 9/1970 | Garrett | |
| 3,528,221 A * | 9/1970 | McDonald, Jr. et al. | 96/61 |
| 3,559,373 A * | 2/1971 | Garrett | 95/1 |
| 4,292,050 A * | 9/1981 | Linhardt et al. | 95/269 |
| 5,261,242 A * | 11/1993 | Lardinois | 62/617 |
| 5,306,330 A * | 4/1994 | Nasikas | 95/267 |
| 6,280,502 B1 | 8/2001 | van Veen et al. | |
| 6,372,019 B1 | 4/2002 | Alferov et al. | |
| 6,513,345 B1 | 2/2003 | Betting et al. | |
| 7,318,849 B2 | 1/2008 | Betting et al. | |
| 7,334,990 B2 * | 2/2008 | Lawlor et al. | 416/20 R |
| 8,016,901 B2 * | 9/2011 | Bloom | 55/315 |
| 2002/0189443 A1 * | 12/2002 | McGuire | 95/32 |
| 2003/0210980 A1 * | 11/2003 | Lawlor et al. | 415/1 |
| 2011/0120303 A1 * | 5/2011 | Bloom | 95/32 |
| 2011/0314776 A1 * | 12/2011 | Bloom | 55/392.1 |

* cited by examiner

*Primary Examiner* — Duane Smith
*Assistant Examiner* — Sonji Turner
(74) *Attorney, Agent, or Firm* — James B. Potts; Brian J. Lally; John T. Lucas (57) ABSTRACT

The disclosure provides an apparatus and method for gas separation through the supersonic expansion and subsequent deceleration of a gaseous stream. The gaseous constituent changes phase from the gaseous state by desublimation or condensation during the acceleration producing a collectible constituent, and an oblique shock diffuser decelerates the gaseous stream to a subsonic velocity while maintain the collectible constituent in the non-gaseous state. Following deceleration, the carrier gas and the collectible constituent at the subsonic velocity are separated by a separation means, such as a centrifugal, electrostatic, or impingement separator. In an embodiment, the gaseous stream issues from a combustion process and is comprised of $N_2$ and $CO_2$.

19 Claims, 3 Drawing Sheets

APPARATUS AND PROCESS FOR THE SEPARATION OF GASES USING SUPERSONIC EXPANSION AND OBLIQUE WAVE COMPRESSION

GOVERNMENT INTERESTS

The United States Government has rights in this invention pursuant to the employer-employee relationship of the Government to the inventors as U.S. Department of Energy employees and site-support contractors at the National Energy Technology Laboratory.

FIELD OF THE INVENTION

One or more of the embodiments relates to a gas separation process utilizing a supersonic expansion followed by a deceleration using the oblique shock wave pattern of an oblique shock diffuser. The supersonic expansion and deceleration generates a phase change of a gaseous constituent to a non-gaseous phase, and the oblique shock wave pattern further provides deceleration to a subsonic velocity while maintaining the constituent in the non-gaseous phase. A separation means such as a centrifugal, electrostatic, impingement, or other separation means acts to separate the non-gaseous phase and the carrier gas.

BACKGROUND

The separation of a gaseous mixture into constituents is useful for a number of industrial and commercial applications. A particular methodology relies on an aerodynamic separation nozzle to urge various gas species comprising a mixture to be separated as a result of pressure and temperature decreases experienced during supersonic expansion. Adiabatic cooling of the gas mixture during the expansion results in the phase change of one or more of the constituents into a non-gaseous phase, typically liquid, and subsequent separation based on differing phases is enabled. See e.g. U.S. Pat. No. 3,528,217 issued to Garrett, issued Sep. 15, 1970; U.S. Pat. No. 6,280,502 issued to van Veen et al., issued Aug. 28, 2001; U.S. Pat. No. 6,372,019 issued to Alferov et al., issued Apr. 16, 2002; U.S. Pat. No. 6,513,345 issued to Betting et al., issued Feb. 4, 2003; and U.S. Pat. No. 7,318,849 issued to Betting at al., issued Feb. 4, 2008, among others. These devices generally specify a supersonic expansion, phase change of a constituent, and subsequent separation based on the differing phases.

Various separation methodologies are employed following the supersonic expansion. For example, when phase change to liquid is employed, the flow path of the gaseous stream at a supersonic or subsonic velocity may be altered so that the gaseous component avoids a perforated wall while centrifugal forces force the impingement of the liquid phase against the perforated wall, affecting a degree of separation. See e.g. U.S. Pat. No. 3,528,217 to Garrett. Another common approach has been to effect separation following a supersonic expansion by imparting a swirl to the supersonic gaseous stream, and allowing the resulting centrifugal forces to affect a stratification where the liquid or solid constituent resides substantially in a layer adjacent to the walls of a test section while the gaseous phase resides substantially toward the center of the flow. Following the stratification, various means including annular flow passages, perforated walls, and combinations thereof are utilized for final separation. See e.g. U.S. Pat. No. 6,280,502 to van Veen et al., U.S. Pat. No. 6,372,019 to Alferov et al., and U.S. Pat. Nos. 6,513,345 and 7,318,849 to Betting at al.

The centrifugal stratification relied upon by the above devices requires that thermodynamic conditions at the wall, where the liquid or solid constituents collect, be maintained such that the solid or liquid constituent remains in the non-gaseous phase. Depending on the gaseous constituent to be separated, this can levy significant additional requirements aimed at prevention of heat transfer from the surroundings to the wall portion of the supersonic device, in order to establish conditions where the liquid or solid constituent is maintained until separation occurs. The supersonic expanding flow also generates viscous boundary layers at the wall, which further complicates a process whereby swirling flow is intended to generate and maintain a liquid or solid constituent residing at the wall. Additionally, generating swirl in order to create the rotating supersonic flow levies additional complexities geometric or otherwise within the supersonic nozzle itself.

It would be advantageous to provide an apparatus and method for the removal of a gaseous constituent from a gaseous stream utilizing a supersonic expansion where the thermodynamic conditions and boundary layers at the wall were less relevant. It would be further advantageous if the removal could occur without the additional complexities generated by the necessity of a supersonic swirling flow.

The aforementioned references further are designed to create separation in the gaseous mixture at a supersonic velocity, and are not particularly compatible with existing separation devices designed for subsonic flows. An apparatus and method where a supersonic expansion and deceleration is utilized to facilitate phase change, and which subsequently decelerates the flow to a subsonic flow while maintaining the phase difference, would allow use of existing separation devices with a minimum of modification. Such an apparatus and method could utilize, for example, existing centrifugal separators designed for subsonic centrifugal separations.

One device frequently utilized for the deceleration of supersonic flows is the supersonic diffuser. Diffusers generally convert the kinetic energy of a supersonic fluid at the diffuser inlet into an increased pressure at the diffuser exit. A common application is following a supersonic wind tunnel test section, where an exit diffuser may be present in order to reduce the pressure ratio required for wind tunnel operation. Typically in the diffuser, a converging geometry creates a series of reflecting oblique shocks which gradually slow the supersonic flow until a weak normal shock brings the flow to subsonic speed. A divergent section may continue to slow the flow and increase pressure. Another common application occurs in the provision of combustion air to aircraft designed for operation at supersonic velocities, where a variable diffuser typically creates oblique shock waves in order to facilitate air flow to the combustion process. These applications utilize the known propensity of an oblique shock to reduce the pressure loss associated with deceleration to a subsonic velocity as compared to a normal shock at a given Mach number. However, these applications and others are typically concerned with maximizing pressure recovery given other constraints, and the specific temperature and pressure profile that a decelerating gas traverses en route to subsonic velocity is generally secondary. For gaseous separation methodologies, it would be advantageous to utilize a diffuser whereby the supersonic flow could be decelerated to subsonic flow following a temperature and pressure profile which maintains the constituent to be separated in a non-gaseous phase.

Accordingly, it is an object of this disclosure to provide an apparatus and method whereby a supersonic expansion and deceleration is utilized to facilitate phase change of a gas constituent, and where subsequent deceleration to subsonic flow occurs while maintaining the phase difference, such that a final separation could occur at a subsonic velocity.

Further, it is an object of this disclosure to provide an apparatus and method whereby the phase change of a gaseous constituent resulting from a supersonic expansion and deceleration is maintained during a subsequent deceleration to subsonic velocity, allowing for utilization of existing separation devices with a minimum of modification Further, it is an object of this disclosure to provide an apparatus and method whereby a supersonic expansion and deceleration is utilized to facilitate phase change of a gas constituent and where the phase change can be maintained with a mitigation of viscous boundary layer impacts.

Further, it is an object of this disclosure to provide an apparatus and method whereby a supersonic expansion and deceleration is utilized to facilitate phase change of a gas constituent and where separation of the gas constituent and a carrier gas can occur in the absence of additional complexities generated by the necessity of a supersonic swirling flow.

Further, it is an object of this disclosure to provide an apparatus and method whereby an oblique shock diffuser decelerates a supersonic flow comprised of a carrier gas and a gas constituent by facilitating a temperature and pressure profile such that the constituent is present in a non-gaseous phase at a subsonic velocity.

These and other objects, aspects, and advantages of the present disclosure will become better understood with reference to the accompanying description and claims.

SUMMARY

The disclosure herein provides for separation of a gaseous constituent from a gaseous stream comprised of the gaseous constituent and a carrier gas. The apparatus and method utilizes pressure and temperature decreases occurring during a supersonic acceleration and deceleration of a gaseous mixture to alter the phase of a gaseous constituent to a non-gaseous phase. Following the supersonic acceleration, deceleration of the supersonic flow occurs via an oblique shock wave pattern generated by an oblique shock diffuser. Interaction between the supersonic flow and the oblique shock wave pattern decelerates the flow to a subsonic velocity through a pressure and temperature profile where the non-gaseous phase of the constituent to be separated is maintained. Following the deceleration, the carrier gas and the collectible constituent at the subsonic velocity are separated by a separation means, such as a centrifugal, electrostatic, or impingement separator.

The gaseous constituent and the carrier gas comprising the gaseous stream have comparative properties such that the gaseous constituent changes phase from the gaseous state by desublimation or condensation at a higher temperature than the carrier phase, over a given pressure range where the separation operation is to be conducted. The gaseous mixture is accelerated to a supersonic velocity causing a pressure and temperature decrease, followed by a deceleration resulting in a pressure and temperature increase. The acceleration and deceleration provide a temperature and pressure profile such that the gaseous constituent changes phase from the gaseous state by desublimation or condensation while the carrier gas remains in the gaseous phase, producing a non-gaseous collectible constituent and the gaseous carrier gas at a subsonic velocity.

The apparatus is comprised of a flow accelerator such as a supersonic nozzle, an oblique shock diffuser in fluid communication with the flow accelerator, and a separation means such as a centrifugal, electrostatic, or impingement separator. The flow accelerator acts to accelerate the gaseous stream to the specified supersonic velocity. The oblique shock diffuser acts to receive the supersonic flow of the carrier gas at the specified supersonic velocity and decelerate the flow to a subsonic velocity while maintaining the collectible constituent in a non-gaseous phase. The separation means receives the subsonic flow and affects final separation by, for example, centrifugal forces.

In an embodiment, the apparatus receives scrubbed and dehydrated flue gas originating from a combustion process providing a gaseous stream comprised of $N_2$, $CO_2$, $O_2$, and possibly various unscrubbed particulates. The specified supersonic velocity is based on achieving phase change of the constituent gas $CO_2$ while maintaining carrier gas $N_2$ in the gaseous phase. The collectible constituent is solid $CO_2$. The separation means is a centrifugal, electrostatic, or impingement separator which receives the subsonic stream from an oblique shock diffuser and issues a carrier stream comprised of the $N_2$ carrier gas and a constituent stream comprised of the solid $CO_2$. The $CO_2$ comprising the constituent stream may then be prepared for storage and/or sequestration in solid, liquid, or gaseous form.

The apparatus and method incurs advantages through the deceleration of the supersonic flow to a subsonic flow through an oblique shock pattern that maintains the collectible constituent in the non-gaseous state, such as mitigation of viscous boundary impacts on the non-gaseous state, avoidance of the necessity for imparting swirl to a supersonic flow, and the ability to utilize separation means originally intended for subsonic operations.

The novel apparatus, methodology, and principles of operation are further discussed in the following description.

BRIEF DESCRIPTION OF THE DRAWINGS

FIG. 1 illustrates an embodiment of the apparatus and method for the removal of a gaseous constituent from a gaseous stream.

FIG. 2 illustrates representative phase boundaries of a gas constituent and a carrier gas.

FIG. 3 illustrates a further embodiment of the apparatus and method for the removal of a gaseous constituent from a gaseous stream.

DETAILED DESCRIPTION

The following description is provided to enable any person skilled in the art to use the invention and sets forth the best mode contemplated by the inventor for carrying out the invention. Various modifications, however, will remain readily apparent to those skilled in the art, since the principles of the present invention are defined herein specifically to provide a process whereby the separation of a gas constituent from a gaseous mixture occurs via phase change during a supersonic expansion and compression, where the supersonic flow is decelerated to subsonic flow using an oblique shock diffuser providing a temperature and pressure profile which maintains the constituent in a non-gaseous phase.

The disclosure herein provides for separation of a gaseous constituent from a gaseous stream comprised of the gaseous constituent and a carrier gas. The apparatus and method utilizes pressure and temperature decreases occurring during the supersonic acceleration and deceleration of a gaseous mixture to alter the phase of a gaseous constituent to a non-gaseous phase. The gaseous constituent and the carrier gas comprising the gaseous stream have comparative properties such that the gaseous constituent changes phase from the gaseous state by desublimation or condensation at a higher temperature than the carrier phase, over a given pressure range where the separation operation is to be conducted.

Acceleration of the gaseous mixture occurs from an initial velocity to a specified supersonic velocity, such that at the conclusion of the acceleration, the gaseous stream is at the specified supersonic velocity with an acceleration temperature and an acceleration pressure. Following the supersonic acceleration, deceleration of the supersonic flow occurs via an oblique shock pattern generated by an oblique shock diffuser. The oblique shock wave pattern decelerates the gaseous stream from the specified supersonic velocity to a subsonic velocity through a deceleration temperature-pressure profile originating at the acceleration temperature and the acceleration pressure.

The deceleration temperature-pressure profile subsequently terminates at a deceleration temperature and a deceleration pressure at the outlet of the oblique shock diffuser. The acceleration temperature, acceleration pressure, and the deceleration temperature-pressure profile combine such that the temperature of the gaseous stream crosses a phase boundary of the gaseous constituent, so that some or substantially all of the gaseous constituent changes phase by desublimation or condensation, and thereby forms a non-gaseous collectable constituent. Further, the acceleration temperature, acceleration pressure, and the deceleration temperature-pressure profile combine such that the collectible constituent is maintained in the non-gaseous phase at the diffuser outlet, while the carrier gas is maintained in the gaseous phase. Following the deceleration, the carrier gas and the collectible constituent at the subsonic velocity are separated by a separation means, such as a centrifugal, electrostatic, or impingement separator, or other means known in the art.

The apparatus is comprised of a flow accelerator such as a supersonic nozzle, an oblique shock diffuser in fluid communication with the flow accelerator, and a separation means. The flow accelerator acts to accelerate the gaseous stream to the specified supersonic velocity, generating the acceleration temperature and the acceleration pressure. The oblique shock diffuser receives the supersonic flow at the specified supersonic velocity, and the oblique shock diffuser has a diffuser profile such that an oblique shock pattern generates in response to the supersonic flow at the specified supersonic velocity. The oblique shock pattern results in a series of pressure and temperature increases and generates the deceleration temperature-pressure profile during the deceleration. The acceleration temperature, acceleration pressure, and the deceleration temperature-pressure profile combine to produce the non-gaseous collectible constituent and the gaseous carrier gas at a subsonic velocity at the diffuser outlet. The separation means receives the subsonic flow and affects final separation by, for example, centrifugal forces.

The apparatus and method utilizes the combined action of the acceleration temperature and acceleration pressure generated during the acceleration and the deceleration temperature-pressure profile generated during the deceleration, and acts on a gaseous mixture comprised of a carrier gas and a gaseous constituent to be separated. As is understood, during a supersonic acceleration, the temperature and pressure of a gas decreases as the velocity is increased. As similarly understood, during a deceleration through an oblique shock pattern, the temperature and pressure of the gas increases as the velocity is decreased. Further, as is known in the art, various predictive and empirical methodologies are available in order to discern the particular temperature and pressure conditions experienced by a gas undergoing both the acceleration and deceleration processes, based on the gaseous properties of the mixture, the geometry and behavior of the acceleration and deceleration devices, and other factors. The apparatus and method disclosed herein exploits these capabilities by decreasing the temperature of a gaseous mixture through acceleration to a specified supersonic velocity in order to reduce the temperature and pressure of the gaseous mixture, followed by increasing the temperature and pressure via an oblique shock pattern in order to subsequently increase the temperature and pressure. The temperature and pressure decrease and subsequent increase occurs in such a manner that the gaseous constituent alters phase to form the collectible constituent while the carrier gas remains in the gaseous phase, and a non-gaseous collectible constituent and gaseous carrier gas at a subsonic velocity results.

As discussed, the comparative properties of the carrier gas and the gaseous constituent are such that the gaseous constituent changes phase from the gaseous state by desublimation or condensation at a higher temperature than the carrier phase. The disclosure herein exploits this comparative property through the use of acceleration and subsequent deceleration as described above. The combination of this acceleration and deceleration action results in the temperature and pressure of the gaseous mixture crossing a phase boundary of the gaseous constituent, such that the gaseous constituent alters phase to form the collectible constituent, while the carrier gas remains in the gaseous phase. The phase change to the collectible constituent may occur during either prior to the supersonic flow achieving the acceleration temperature and acceleration pressure, or may occur as a result of the subsequent the deceleration temperature-pressure profile, as will be discussed infra. The deceleration temperature-pressure profile then further acts to reduce the velocity of the carrier gas and the collectible constituent to a subsonic velocity while describing pressure and temperature conditions which maintain the collectible constituent in the non-gaseous phase and the carrier gas in the gaseous phase. A separation means known in the art may then be utilized to affect separation of the subsonic mixture, where the carrier gas has a gaseous phase and the collectible constituent has a non-gaseous phase.

The apparatus and method incurs advantages through the deceleration of the supersonic flow to a subsonic flow through an oblique shock pattern that maintains the collectible constituent in the non-gaseous state, such as mitigation of viscous boundary impacts on the non-gaseous state, avoidance of the necessity for imparting swirl to a supersonic flow, and the ability to utilize separation means originally intended for subsonic operations.

Figure 1:
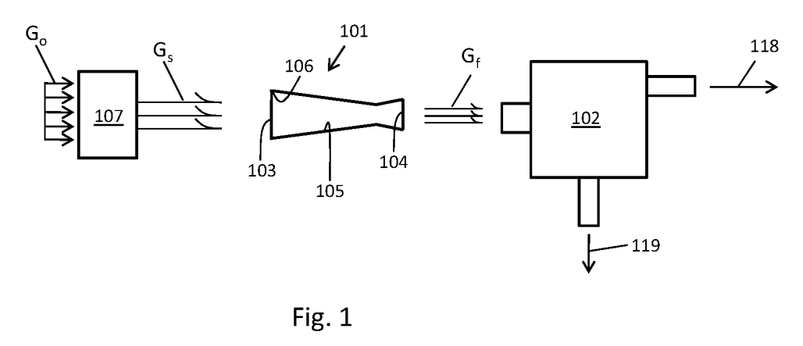

FIG. 1 illustrates an embodiment showing an oblique shock diffuser generally at 101, separation means 102, and flow accelerator 107. Oblique shock diffuser 101 is further comprised of diffuser inlet 103, diffuser outlet 104, and has diffuser profile 105 through the interior. As illustrated, diffuser inlet 103 is in fluid communication with flow accelerator 107, and diffuser outlet 104 is in fluid communication with separation means 102. Oblique shock diffuser 101 is further comprised of compression corner 106.

Flow accelerator 107 receives a gaseous mixture flow $G_o$ comprised of a carrier gas and a gaseous constituent, where the gaseous constituent and the carrier gas have comparative properties such that the gaseous constituent changes phase from the gaseous state by desublimation or condensation at a higher temperature than the carrier phase, over a given pressure range where the separation operation is to be conducted. For example, the carrier gas may be $N_2$ and the gaseous constituent may be $CO_2$, and the applicable pressure range may be 50 atmospheres and below. Flow accelerator 107 acts to accelerate gaseous mixture flow $G_o$ from an initial pressure, temperature, and velocity condition to a supersonic flow $G_s$, where the supersonic flow $G_s$ has a specified supersonic velocity.

As is understood, the temperature and pressure of the gaseous stream decrease during the acceleration to the specified supersonic velocity. For example, with reference to FIG. 2, a gaseous mixture enters flow accelerator 107 at a pressure and temperature condition represented by point A. The gaseous mixture is accelerated to a specified supersonic velocity by flow accelerator 107 and achieves an acceleration temperature and an acceleration pressure, represented by the temperature and pressure condition at point C, via the path A-B-C.

Flow accelerator 107 may be any device or process sufficient to receive a gaseous mixture flow $G_o$ comprised of a carrier gas and a gaseous constituent and accelerate the flow to a specified supersonic velocity, producing supersonic flow $G_s$. For example, in an exemplary embodiment, flow accelerator 107 is a converging-diverging nozzle designed to accelerate gaseous mixture flow $G_o$ from an initial subsonic velocity to a specified supersonic velocity. Flow accelerator 107 may be other suitable devices such as a supersonic compressor, or any process that receives the gaseous mixture flow $G_o$ and results in the supersonic flow $G_s$ as a result of a gaseous acceleration to the specified supersonic velocity. Further, within this disclosure, supersonic flow $G_s$ is comprised of the carrier gas in a gaseous phase, and either the gaseous constituent in a gaseous phase or the collectible constituent in a non-gaseous phase, as will be discussed infra. Additionally, within this disclosure, when the supersonic flow achieves the acceleration temperature and acceleration pressure, this indicates that at least the gaseous phases of the supersonic flow are at the acceleration temperature and acceleration pressure condition. It is understood that any non-gaseous phases including the collectible constituent, if formed, may or may not have the equivalent temperature and pressure condition.

The acceleration temperature and acceleration pressure resulting from acceleration to a specified supersonic velocity may be predicted or otherwise determined by those skilled in the art for a given gaseous mixture and flow accelerator 107. As will be discussed infra, within this disclosure, the acceleration temperature and acceleration pressure must decrease sufficiently during the acceleration such that the gaseous constituent either crosses a phase boundary during the acceleration, or crosses a phase boundary during the subsequent deceleration, when the supersonic flow transits the deceleration temperature-pressure profile originating at the acceleration temperature and acceleration pressure.

At FIG. 1, oblique shock diffuser 101 is in fluid communication with the flow accelerator 107, such that the supersonic flow $G_s$ enters oblique shock diffuser 101 and encounters compression corner 106. Compression corner 106 generates an oblique shock wave in supersonic flow $G_s$, and diffuser profile 105 acts on the oblique shock wave to generate an oblique shock pattern within oblique shock diffuser 101. The oblique shock pattern decelerates supersonic flow $G_s$ and generates compression in a series of pressure and temperature increases.

The temperature and pressure increase of the supersonic flow during the deceleration generates the deceleration temperature-pressure profile, where the deceleration temperature-pressure profile is comprised of temperature and pressure conditions experienced by the supersonic flow over the course of the deceleration. For example, with reference to FIG. 2, following acceleration to the specified supersonic velocity, the gaseous stream enters oblique shock diffuser 101 at the acceleration temperature and acceleration pressure of point C. During the deceleration, the gaseous mixture experiences a deceleration temperature-pressure profile illustrated by the path C-D-E at FIG. 2. At point E, following deceleration from the specified supersonic velocity to a subsonic velocity via the oblique shock pattern within oblique shock diffuser 101, subsonic flow $G_f$ results at a deceleration temperature and a deceleration pressure, represented at FIG. 2 by the temperature and pressure respectively of point E. As is illustrated at FIG. 2, and because oblique shock diffuser 101 receives supersonic flow $G_s$ at the specified supersonic velocity, the deceleration temperature-pressure profile is necessarily comprised of the acceleration temperature and acceleration pressure of point C.

As discussed, gaseous mixture flow $G_o$ is comprised of a carrier gas and a gaseous constituent, where the gaseous constituent and the carrier gas have comparative properties such that the gaseous constituent changes phase from the gaseous state by desublimation or condensation at a higher temperature than the carrier phase. This can be illustrated at FIG. 2 for a gaseous mixture flow $G_o$ comprised of carrier gas $N_2$ and gaseous constituent $CO_2$. FIG. 2 represents $N_2$ phase boundary 208 and $CO_2$ phase boundary 209 on the logarithmic plot of pressure and temperature. Regions at pressures below $N_2$ phase boundary 208 indicate $N_2$ in a gaseous phase. Similarly, regions at pressures below $CO_2$ phase boundary 209 and temperatures greater than sublimation point S represent $CO_2$ in a gaseous phase, while regions at pressures below $CO_2$ phase boundary 209 and temperatures below sublimation point S represent $CO_2$ in a liquid phase. Regions at pressure above $CO_2$ phase boundary 209 and temperatures below triple point T represent $CO_2$ in the solid phase. The $CO_2$ solid-liquid phase boundary which originates at triple point T and extends to higher pressures is omitted for clarity. As indicated by $CO_2$ phase boundary 209 and $N_2$ phase boundary 208, the gaseous constituent $CO_2$ and the carrier gas $N_2$ have comparative properties such that the gaseous constituent $CO_2$ changes phase from the gaseous state by desublimation or condensation at a higher temperature than the carrier phase over a pressure range of application.

The operation of the apparatus and method disclosed may be illustrated with reference to FIGS. 1 and 2. In an exemplary embodiment, flow accelerator 107 receives a gaseous mixture comprised of carrier gas $N_2$ and gaseous constituent $CO_2$, at the temperature and pressure condition represented by point A. As seen at FIG. 2, at point A both the carrier gas and the gaseous constituent are in the gaseous phase. Flow accelerator 107 then generates a supersonic acceleration of the gaseous mixture to the specified supersonic velocity, reducing the temperature and pressure and generating a supersonic flow at the acceleration pressure and the acceleration temperature of point C, via the exemplary path A-B-C. In this exemplary embodiment, and as illustrated at FIG. 2, the carrier gas $N_2$ and the gaseous constituent $CO_2$ pass through the phase boundary 209 during the acceleration. As a result, in this example, gaseous constituent $CO_2$ forms a collectible constituent of solid $CO_2$ during the acceleration while the carrier gas $N_2$ remains in the gaseous phase.

Figure 2:
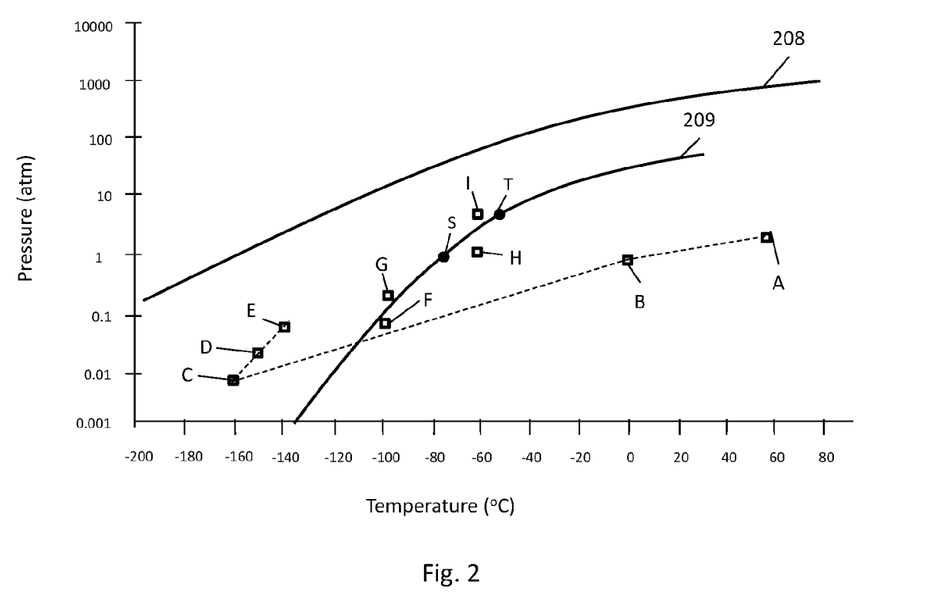

Following acceleration to point C and formation of the collectible constituent in this example, supersonic flow $G_s$ encounters compression corner 106, and the oblique shock pattern within oblique shock diffuser 101 generates compression in a series of pressure and temperature increases, shown representatively as points D and E at FIG. 2. As indicated, the pressure and temperature increases incrementally and remains to the left of $CO_2$ phase boundary 209 and to the right of $N_2$ phase boundary 208, such that the collectible constituent $CO_2$ is maintained in the non-gaseous phase while the carrier gas $N_2$ remains in a gaseous state. At point E, gaseous deceleration in the oblique shock diffuser is complete and subsonic flow $G_f$ results. At point E, the subsonic flow is comprised of carrier gas $N_2$ in the gaseous phase and collectible constituent solid $CO_2$ in the non-gaseous phase.

As is illustrated at FIG. 2 and as discussed supra, the deceleration temperature-pressure profile necessarily originates at the acceleration temperature and acceleration pressure. As a result, the specified supersonic velocity provides the origination pressure and temperature condition. The deceleration temperature-pressure profile subsequently is established by the oblique shock wave pattern arising in oblique shock diffuser 101 when it receives the supersonic flow. For a given gas mixture, the specified supersonic velocity and the deceleration temperature-pressure profile thereby combine to generate temperature and pressure conditions such that the gaseous constituent crosses a phase boundary and forms a collectible constituent during the process while the carrier gas remains in a gaseous state, and the deceleration temperature-pressure profile subsequently maintains the collectible constituent in the non-gaseous state during the compression of the supersonic flow to a subsonic flow, such that a subsonic flow of the collectible constituent and the carrier gas results.

It is understood that the collectible constituent may be produced either during the supersonic acceleration or during the subsequent deceleration to subsonic flow, and that the collectible constituent may be either a solid or liquid phase. For example, at FIG. 2, the gaseous mixture of $N_2$ and $CO_2$ may have a starting pressure and temperature condition such that a specified supersonic velocity generates the acceleration temperature and acceleration pressure of point H, where both the $N_2$ and $CO_2$ remain in the gaseous state. In such a case, the oblique shock pattern generated by the oblique shock diffuser is such that compression of the supersonic flow results in the deceleration temperature and deceleration pressure condition of point I at the diffuser outlet, such that during the compression the gaseous constituent $CO_2$ crosses a phase boundary to form the collectible constituent while the carrier gas $N_2$ remains in the gaseous phase. Similarly, it is further understood that the collectible constituent may undergo multiple phase changes during the process. For example, the gaseous mixture of $N_2$ and $CO_2$ may have a starting pressure and temperature condition such that a specified supersonic velocity generates the acceleration temperature and acceleration pressure of point F, where the $N_2$ carrier gas is in a gaseous phase and the $CO_2$ gaseous constituent has formed a collectible constituent of liquid $CO_2$. The supersonic flow comprised of gaseous $N_2$ and liquid $CO_2$ may then undergo compression in the oblique shock diffuser such that a subsonic flow at the deceleration temperature and deceleration pressure condition of point G at the diffuser outlet results, such that the collectible constituent further changes phase from liquid to solid during the compression. Within this disclosure, it is only necessary that the specified supersonic velocity produce an acceleration temperature and an acceleration pressure such that the subsequent deceleration temperature-pressure profile generated by the oblique shock pattern results in a subsonic flow comprised of carrier gas in the gaseous phase and a collectible constituent in a non-gaseous phase. It is further understood that the sufficiency of the specified supersonic velocity in combination with the deceleration temperature-pressure profile is largely dependent on the composition of the gaseous stream and the initial temperature and pressure of the gaseous stream prior to the acceleration, among other factors. Additionally, although the initial velocity of the gaseous stream is typically subsonic, that is not a limitation within this disclosure.

An appropriate diffuser profile 105 within oblique shock diffuser 101 such that the subsequent compression combined with the acceleration temperature and acceleration pressure maintains the supersonic flow at pressure-temperature relationships similar to that depicted at FIG. 2 may be determined by experimental measurement, flow visualization, computational modeling, combinations thereof, and other means known in the art. In an embodiment, diffuser profile 105 is converging and provides a symmetric internal compression system by generating a mirror image oblique shock wave configuration. The diffuser profile that ensures the condition depicted at FIG. 2 is designed based on the known laws of thermodynamics of gas and the condition of the gas flow entering the diffuser, for example, the specified supersonic velocity, the pressure, the temperature, and the chemical composition. Additionally, it is understood that compression corner 106 is an illustrative term describing a mechanism by which an oblique shock wave is generated in the supersonic flow. Correspondingly, compression corner 106 may be a geometric discontinuity, a profile altering in a substantially continuous manner, or other means known in the art for the generation of oblique shock waves.

A primary concern in the design of diffuser profile 105 is the initial conditions of the gas stream entering the diffuser and the rate of change in the cross sectional area as a function of the stream wise flow direction, (i.e. the area contraction rate). In general the decreasing cross sectional area of diffuser profile 105 causes a supersonic flow to form compression waves which develop into oblique shock waves. The oblique shock waves usually start where there is a change in the angle of the diffuser wall such that the flow is caused to turn into itself. This is most effectively done for supersonic flows confined to the inside of a duct by abruptly reducing the cross sectional area of the diffuser along the stream wise direction of the flow. The resulting shock wave that is formed will propagate from the initial point where there is a change in the wall angle through a point in the center of the flow field until it reaches the opposite wall of the diffuser which is always downstream from the initial point where the shock wave is formed. At this point the oblique shock wave will reflect off of the diffuser side wall and propagate back through the flow field again in a manner that is similar to the first shock wave but at a reduced strength. This process of reflecting oblique shock waves is repeated until the fluid shocks down to a subsonic state. The network of oblique shock waves is collectively called the oblique shock pattern. The angle and strength of the initial oblique shock wave and all the following reflected oblique shock waves depends greatly on changes in the angle between the diffuser side wall and the primary flow direction.

Changes in the angle of the diffuser wall will also change the cross sectional area of the diffuser. Generally in the diffuser section these angles must be changed to diminish the cross sectional area of the diffuser along the stream wise flow direction, which is what gives rise to the diffuser area contraction rate. The area contraction rate greatly affects the strength and location of the flow field and the oblique shock waves in the flow field in the diffuser. If the diffuser is axially symmetric then the flow field and the oblique shock pattern will also be axially symmetric. If the angle that the diffuser wall makes with the primary flow direction is changed too rapidly, then the strength of the resulting oblique shock wave will be strong and the performance of the diffuser will be significantly limited. If the angle that the diffuser side wall makes with the primary flow direction is too small, then the oblique shock wave will not be strong enough and the fluid will not pass into the required state. Again the two extreme conditions give rise to an optimum area contraction rate, or optimum shape of the diffuser, which would be the best possible shape that will bring the fluid to the conditions that are required for the process as disclosed here to operate. This optimum contraction rate will be different for each set of conditions for the flow entering the diffuser and similar to the supersonic nozzle, may be calculated using one or several of the many different techniques that collectively comprise the area of CFD.

An advantage of utilizing an oblique shock diffuser for the deceleration and recompression of the gaseous flow is the mitigation of viscous boundary layer effects on the non-gaseous collectible constituent. As is understood, a supersonic flow is turned into itself by the oblique shock formed when the supersonic flow meets a compression corner and becomes parallel to the wall downstream of the corner. All the streamlines are deflected at a flow deflection angle at the oblique shock, resulting in substantially uniform parallel flow downstream of the oblique shock. In the apparatus and methodology disclosed here, this tendency reduces interactions between the collectible constituent and a viscous boundary layer at the wall which might otherwise occur, and assists in maintaining the collectible constituent in a non-gaseous phase.

It is further understood that the pressure and temperature states illustrated at FIG. 2 are representative and that the oblique shock pattern generated may provide recompression through a variety of pressure and temperature states. Within this disclosure, it is only necessary that the oblique shock diffuser produce a deceleration temperature-pressure profile originating at the acceleration temperature and acceleration pressure such that the subsequent compression results in a subsonic flow comprised of carrier gas in the gaseous phase and a collectible constituent in a non-gaseous phase.

Further, it is understood that the gaseous mixture flow $G_o$ is comprised of a carrier gas and a gaseous constituent, but may include other constituents outside of those designations. For example, the gaseous mixture flow $G_o$ may originate in a combustion process utilizing air and be comprised of constituent gas $CO_2$ and carrier gas $N_2$, and be further comprised of $O_2$ and unscrubbed particulate matter. Within this disclosure, it is only necessary that the composition of a gaseous stream provide a gaseous constituent and a carrier gas, and that the gaseous constituent and the carrier gas have comparative properties such that the gaseous constituent changes phase from the gaseous state by desublimation or condensation at a higher temperature than the carrier phase, over a given pressure range where the separation operation is to be conducted.

Additionally, it is recognized from FIG. 2 that maintaining the collectible constituent in a non-gaseous phase at the subsonic velocity results in a subsonic flow $G_f$ having a temperature which will typically be well below the ambient surroundings. This allows the oblique shock diffuser to also serve as a source for various refrigeration processes, should such processes be required or desired in a given operational environment.

At FIG. 1, the apparatus further includes a separation means 102 in fluid communication with diffuser outlet 104 of oblique shock diffuser 101. Separation means 102 is a device capable of receiving subsonic flow $G_f$ comprised of the collectible constituent in a non-gaseous phase and the carrier gas in the gaseous phase, and subsequently affecting separation based on the phase difference. For example, separation means 102 may be a centrifugal separator designed to affect separation of the collectible constituent and the carrier gas through resulting centrifugal forces. Alternatively, separation means 102 may be a device employing filters, settling chambers, scrubbers, and the like in order to precipitate separation of the collectible constituent in the non-gaseous phase and the carrier gas in the gaseous phase. Various means are known in the art and are compatible with the apparatus of this disclosure. In operation, following the action of separation means 102, the collectible constituent and the carrier gas are physically separated. For example, at FIG. 1, separation means 102 produces carrier stream 118 comprised of the carrier gas and constituent stream 119 comprised of the collectible constituent.

Figure 3:
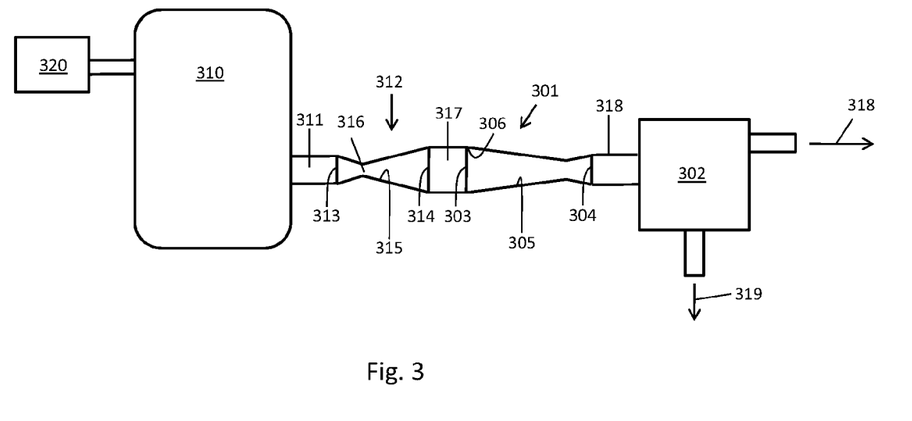

A further embodiment of the apparatus disclosed herein is illustrated at FIG. 3. FIG. 3 depicts a reservoir 310, a supersonic nozzle generally indicated at 312, an oblique shock diffuser generally indicated at 301, and a separation means 302. Supersonic nozzle 312 is further comprised of nozzle inlet 313 and nozzle outlet 314. Oblique shock diffuser 301 is further comprised of diffuser inlet 303, diffuser outlet 304, and has diffuser profile 305 through the interior. As illustrated, reservoir 310 is in fluid communication with nozzle inlet 313 through conduit 311, nozzle outlet 314 is in fluid communication with diffuser inlet 303 through conduit 317, and diffuser outlet 304 is in fluid communication with separation means 302 through conduit 318. Oblique shock diffuser 301 is further comprised of compression corner 306.

In operation, reservoir 310 holds a gaseous mixture comprised of a carrier gas and a gaseous constituent, where the gaseous constituent and the carrier gas have comparative properties such that the gaseous constituent changes phase from the gaseous state by desublimation or condensation at a higher temperature than the carrier phase, over a given pressure range where the separation operation is to be conducted. For example, the carrier gas may be $N_2$ and the gaseous constituent may be $CO_2$. In an embodiment, the gas stream is comprised of at least 8 wt % $CO_2$ and at least 50 wt % $N_2$.

Reservoir 310 is utilized to generate a gaseous stream from the gaseous mixture through conduit 311. The pressure and temperature of the gaseous mixture in reservoir 310 is such that the gaseous stream has an inlet pressure, an inlet temperature, and an inlet mass flow rate at nozzle inlet 313. The inlet pressure and inlet mass flow rate at nozzle inlet 313 is such that the gaseous stream enters supersonic nozzle 312 and is accelerated to a sonic velocity and further expanded to a specified supersonic velocity. At FIG. 3, supersonic nozzle 312 is a converging-diverging supersonic nozzle having throat 316. As the supersonic flow accelerates to the specified supersonic velocity downstream of throat 316, the temperature and pressure of the supersonic flow decreases as the velocity of the supersonic flow increases. At the specified supersonic velocity, the supersonic flow is at an acceleration temperature and an acceleration pressure. At the specified supersonic velocity, the supersonic flow is comprised of carrier gas $N_2$ in the gaseous phase and either constituent gas $CO_2$ in the gaseous phase or collectible constituent $CO_2$ in the liquid or solid phase.

A primary concern in the proper design of supersonic nozzle 312 is the inlet conditions of the gas stream entering the expansion nozzle, and the rate of change in the cross sectional area as a function of the stream wise flow direction, (i.e. the area expansion rate). If the area expansion rate occurs to abruptly then flow separation may occur and the gas velocity may not achieve the supersonic state with the corresponding and necessary temperature and pressure drop. If the area expansion rate occurs to gradually then frictional effects could become significant and also limit or diminish the effective of the process. In general these two extreme conditions will be different for each set of initial conditions of the fluid that enters the nozzle, and because the extremes occur at a minimum and maximum area expansion rate there will exist an optimum expansion rate which must be determined. This optimum expansion rate will be different for each set of initial conditions and it may be calculated using one or several of the many different techniques that collectively comprise the area of Computational Fluid Dynamics (CFD). These techniques are very well known and widely used by design engineers who practice in the field of aerodynamics and fluid dynamics.

As illustrated, oblique shock diffuser 301 is in fluid communication with nozzle outlet 314 through conduit 317. As before, the supersonic flow enters oblique shock diffuser 301 and encounters compression corner 306. Compression corner 306 and oblique shock wave diffuser profile 305 generate an oblique shock pattern. The oblique shock pattern decelerates the supersonic flow to a subsonic flow in a series of pressure and temperature increases defining the deceleration temperature-pressure profile. The acceleration temperature, acceleration pressure, and the deceleration temperature-pressure profile combines to generate a subsonic flow at diffuser outlet 304, where the subsonic flow is comprised of the collectible constituent in the non-gaseous phase and the carrier gas in the gaseous phase. In the embodiment shown, diffuser profile 305 within oblique shock diffuser 301 is substantially converging and provides a symmetric internal compression system by generating a mirror image oblique shock wave configuration. A separation means 302 is in fluid communication with diffuser outlet 304 through conduit 318. In the embodiment shown, separation means 302 is centrifugal, electrostatic, or impingement separator, or another separation means known in the art.

It is understood that conduits 314 and 317 are included for the purposes of illustration. The presence or absence of conduits such as 314 and 317 is not intended to be a limitation of this disclosure. Similarly, it is further understood that the symmetrical nature of the supersonic nozzle 312 and the oblique shock diffuser 301 is not intended to be a limitation of this disclosure, as those skilled in the art recognize that further shapes that are not symmetrical which will provide the same function.

The specified supersonic velocity, the corresponding acceleration pressure and acceleration temperature, and the subsequent deceleration temperature-pressure profile generated by oblique shock diffuser 301 in order to produce a subsonic flow of carrier gas and collectible constituent is largely a function of the gaseous stream composition, the inlet pressure, the inlet temperature of the gaseous stream, the general cross-sectional areas of the expanding and constricting flows, and the comparative properties of the gaseous constituent and the carrier gas. Similarly, for a given supersonic nozzle geometry, the supersonic velocity achieved by supersonic nozzle 312 is largely a function of the inlet pressure and inlet mass flow rate. As a result, in operation, reservoir 310 must act to provide the gaseous stream to nozzle inlet 313 at an inlet pressure and an inlet mass flow rate such that the specified supersonic velocity is achieved by supersonic nozzle 312, and reservoir 310 must further provide the gaseous stream to nozzle inlet 313 at an initial temperature such that the expansion and subsequent compression downstream of throat 316 alters the gaseous constituent phase while the carrier gas remains in the gaseous state. The sufficiency of the specified supersonic velocity and the subsequent deceleration pressure-temperature profile in order to meet this condition may be determined through experimental measurement, visual observation, computational modeling, combinations thereof, and other means known in the art.

In an embodiment, reservoir 310 receives a scrubbed and dehydrated flue gas originating from a combustion process in power plant 320 and provides a gaseous stream comprised of $N_2$, $CO_2$, $O_2$, and possibly various unscrubbed particulates. Reservoir 310 supplies a gaseous stream at a subsonic velocity to supersonic nozzle 312, and the specified supersonic velocity is preferably Mach>2, more preferably Mach>3. At the specified supersonic velocity, the collectible constituent is solid $CO_2$. Separation means 302 is a centrifugal, electrostatic, impingement, or other separation means which receives the subsonic stream from oblique shock diffuser 301 and issues carrier stream 318 comprised of the $N_2$ carrier gas and constituent stream 319 comprised of the solid $CO_2$. The $CO_2$ comprising constituent stream 319 may then be prepared for storage and/or sequestration in solid, liquid, or gaseous form.

Thus, the disclosure herein provides an apparatus and method for utilizing the acceleration of a gaseous mixture to a specified supersonic velocity followed by a deceleration of the supersonic flow via an oblique shock pattern generated by an oblique shock diffuser, in order to affect separation of a gaseous mixture comprised of a carrier gas and a gaseous constituent. Interaction between the supersonic flow and the oblique shock pattern decelerates the flow to a subsonic velocity through a pressure and temperature profile where the non-gaseous phase of the constituent to be separated is maintained. Following the deceleration, the carrier gas and the collectible constituent at the subsonic velocity are separated by a separation means. The deceleration of the supersonic flow to a subsonic flow through the oblique shock pattern and maintenance of the collectible constituent in the non-gaseous state fosters various advantages, such as mitigation of viscous boundary impacts on the non-gaseous state, avoidance of the necessity for imparting swirl to a supersonic flow, and the ability to utilize separation means originally intended for subsonic operations.

Accordingly, the disclosure provides an apparatus and method whereby a supersonic expansion and deceleration is utilized to facilitate phase change of a gas constituent, and where subsequent deceleration to subsonic flow occurs while maintaining the phase difference, such that a final separation could occur at a subsonic velocity.

Further, the disclosure provides an apparatus and method whereby the phase change of a gaseous constituent resulting from a supersonic expansion and deceleration is maintained during a subsequent deceleration to subsonic velocity, allowing for utilization of existing separation devices with a minimum of modification Further, the disclosure provides an apparatus and method whereby a supersonic expansion and deceleration is utilized to facilitate phase change of a gas constituent and where the phase change can be maintained with a mitigation of viscous boundary layer impacts.

Further, the disclosure provides an apparatus and method whereby a supersonic expansion and deceleration is utilized to facilitate phase change of a gas constituent and where separation of the gas constituent and a carrier gas can occur in the absence of additional complexities generated by the necessity of a supersonic swirling flow.

Further, the disclosure provides an apparatus and method whereby an oblique shock diffuser decelerates a supersonic flow comprised of a carrier gas and a gas constituent by facilitating a temperature and pressure profile such that the constituent is present in a non-gaseous phase at a subsonic velocity.

It is to be understood that the above-described arrangements are only illustrative of the application of the principles of the present invention and it is not intended to be exhaustive or limit the invention to the precise form disclosed. Numerous modifications and alternative arrangements may be devised by those skilled in the art in light of the above teachings without departing from the spirit and scope of the present invention. It is intended that the scope of the invention be defined by the claims appended hereto.

In addition, the previously described versions of the present invention have many advantages, including but not limited to those described above. However, the invention does not require that all advantages and aspects be incorporated into every embodiment of the present invention.

All publications and patent documents cited in this application are incorporated by reference in their entirety for all purposes to the same extent as if each individual publication or patent document were so individually denoted.

What is claimed is:

1. A method for the removal of a gaseous constituent from a gas stream comprised of a carrier gas and the gaseous constituent, where the gas stream is at an initial temperature and an initial pressure, and where the carrier gas and the gaseous constituent comprising the gas stream are in a gaseous state at the initial temperature and the initial pressure, and where the gaseous constituent alters phase by desublimation or condensation at a higher temperature than the carrier gas at a given pressure, comprising:
    accelerating the gas stream to a specified supersonic velocity, thereby establishing the gas stream at an acceleration temperature and an acceleration pressure, where the acceleration temperature is less than the initial temperature and where the acceleration pressure is less than the initial pressure;
    directing the gas stream at the specified supersonic velocity to a diffuser inlet of an oblique shock diffuser, where the oblique shock diffuser is comprised of a compression corner and a diffuser profile;
    contacting the gas stream and the compression corner and allowing the compression corner and the diffuser profile to generate an oblique shock wave pattern in the oblique shock diffuser;
    decelerating the gas stream at the specified supersonic velocity to a subsonic flow at a subsonic velocity through a deceleration temperature-pressure profile by flowing the gas stream through the oblique shock wave pattern in the oblique shock diffuser, where the deceleration temperature-pressure profile is a plurality of pressure and temperature conditions experienced by the gas stream during the decelerating, and where the deceleration temperature-pressure profile originates at the acceleration temperature and the acceleration pressure and terminates at a deceleration temperature and a deceleration pressure at a diffuser outlet of the oblique shock diffuser, where the deceleration temperature is greater than the acceleration temperature and the deceleration pressure is greater than the acceleration pressure, and where the gaseous constituent crosses a phase boundary of the gaseous constituent as the gas stream transitions from the initial temperature and the initial pressure to the deceleration temperature and the deceleration pressure such that the gaseous constituent forms a collectable constituent, where the collectible constituent is a non-gaseous phase at the deceleration temperature and the deceleration pressure, and where the carrier gas is maintained in the gaseous state at the deceleration temperature and the deceleration pressure, such that the collectible constituent and the carrier gas comprise the subsonic flow at the diffuser outlet of the oblique shock diffuser; and
    transferring the subsonic flow from the diffuser outlet to a separation means, and separating the collectible constituent and the carrier gas using the separation means, thereby removing the gaseous constituent from the gas stream.

2. The method of claim 1 where the accelerating step comprises:
    porting the gas stream to a nozzle inlet of a supersonic nozzle, where the supersonic nozzle has a geometry such that when the gas stream is ported to the nozzle inlet at an inlet pressure, an inlet temperature, and an inlet mass flow rate, the supersonic nozzle acts to accelerate the gas stream such that the gas stream achieves the specified supersonic velocity at a nozzle outlet of the supersonic nozzle; and
    maintaining the nozzle outlet of the supersonic nozzle in fluid communication with the diffuser inlet of the oblique shock diffuser, such that the gas stream at the specified supersonic velocity is directed to the diffuser inlet of the oblique shock diffuser.

3. The method of claim 1 where the decelerating step comprises subjecting the gas stream to a converging diffuser profile following the contact between the gas stream and the compression corner, thereby increasing a pressure of the gas stream and thereby decreasing a velocity of the gas stream, and thereby subjecting the collectible constituent to at least some portion of the converging diffuser profile.

4. The method of claim 3 further comprising forming the collectible constituent in the non-gaseous phase during the accelerating step.

5. The method of claim 4 further comprising maintaining the deceleration temperature-pressure profile during the decelerating step such that the collectible constituent is in the non-gaseous phase at each of the plurality of pressure and temperature conditions experienced by the gas stream during the decelerating.

6. The method of claim 3 further comprising forming the collectible constituent during the decelerating the gas stream at the specified supersonic velocity to a subsonic flow step.

7. The method of claim 1 where the collectible constituent is a solid phase at the diffuser outlet.

8. The method of claim 7 where the gaseous constituent is $CO_2$ and the carrier gas is $N_2$.

9. The method of claim 8 where the gas stream is comprised of at least 8 wt % $CO_2$ and at least 50 wt % $N_2$.

10. The method of claim 9 where the specified supersonic velocity is at least Mach 3.

11. A method for the removal of a gaseous constituent from a gas stream comprised of a carrier gas and the gaseous constituent, where the gas stream is at an initial temperature and an initial pressure, and where the carrier gas and the gaseous constituent comprising the gas stream are in a gaseous state at the initial temperature and the initial pressure, and where the gaseous constituent alters phase by desublimation or condensation at a higher temperature than the carrier gas at a given pressure, comprising:
    accelerating the gas stream to a specified supersonic velocity, thereby establishing the gas stream at an acceleration temperature and an acceleration pressure, where the acceleration temperature is less than the initial temperature and where the acceleration pressure is less than the initial pressure;
    directing the gas stream at the specified supersonic velocity to a diffuser inlet of an oblique shock diffuser, where the oblique shock diffuser is comprised of a compression corner and a diffuser profile, where the diffuser profile is a converging diffuser profile;

contacting the gas stream and the compression corner and allowing the compression corner and the diffuser profile to generate an oblique shock wave pattern in the oblique shock diffuser;

decelerating the gas stream at the specified supersonic velocity to a subsonic flow at a subsonic velocity through a deceleration temperature-pressure profile by flowing the gas stream through the oblique shock wave pattern in the oblique shock diffuser and subjecting the gas stream to the converging diffuser profile of the oblique shock diffuser, where the deceleration temperature-pressure profile is a plurality of pressure and temperature conditions experienced by the gas stream during the decelerating, and where the deceleration temperature-pressure profile originates at the acceleration temperature and the acceleration pressure and terminates at a deceleration temperature and a deceleration pressure at a diffuser outlet of the oblique shock diffuser, where the deceleration temperature is greater than the acceleration temperature and the deceleration pressure is greater than the acceleration pressure, and where the gaseous constituent crosses a phase boundary of the gaseous constituent as the gas stream transitions from the initial temperature and the initial pressure to the deceleration temperature and the deceleration pressure such that the gaseous constituent forms a collectable constituent, where the collectible constituent is a non-gaseous phase at the deceleration temperature and the deceleration pressure, and where the carrier gas is maintained in the gaseous state at the deceleration temperature and the deceleration pressure, such that the collectible constituent and the carrier gas comprise the subsonic flow at the diffuser outlet of the oblique shock diffuser, and thereby increasing a pressure of the gas stream and thereby decreasing a velocity of the gas stream, and thereby subjecting the collectible constituent to at least some portion of the converging diffuser profile; and transferring the subsonic flow from the diffuser outlet to a separation means, and separating the collectible constituent and the carrier gas using the separation means, thereby removing the gaseous constituent from the gas stream.

12. The method of claim 11 where the accelerating step comprises:

porting the gas stream to a nozzle inlet of a supersonic nozzle, where the supersonic nozzle has a geometry such that when the gas stream is ported to the nozzle inlet at an inlet pressure, an inlet temperature, and an inlet mass flow rate, the supersonic nozzle acts to accelerate the gas stream such that the gas stream achieves the specified supersonic velocity at a nozzle outlet of the supersonic nozzle; and maintaining the nozzle outlet of the supersonic nozzle in fluid communication with the diffuser inlet of the oblique shock diffuser, such that the gas stream at the specified supersonic velocity is directed to the diffuser inlet of the oblique shock diffuser.

13. The method of claim 12 further comprising forming the collectible constituent in the non-gaseous phase during the accelerating step.

14. The method of claim 13 further comprising maintaining the deceleration temperature-pressure profile during the decelerating step such that the collectible constituent is in the non-gaseous phase at each of the plurality of pressure and temperature conditions experienced by the gas stream during the decelerating.

15. The method of claim 14 where the collectible constituent is a solid phase at the diffuser outlet, and where the separation means is a gas-solid separator.

16. The method of claim 15 where the gaseous constituent is $CO_2$ and the carrier gas is $N_2$.

17. The method of claim 16 where the gas stream is comprised of at least 8 wt % $CO_2$ and at least 50 wt % $N_2$.

18. The method of claim 17 where the specified supersonic velocity is at least Mach 3.

19. The method of claim 12 further comprising forming the collectible constituent during the decelerating the gas stream at the specified supersonic velocity to a subsonic flow step.

* * * * *